P. G. HOLLSTEIN.
POWDERED COCOA FLUFFER, MIXER, AND COOLER.
APPLICATION FILED JAN. 10, 1912.
1,050,738.
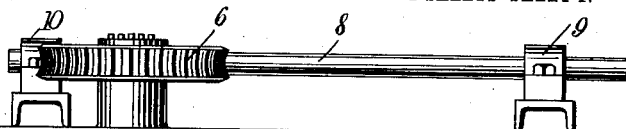
Patented Jan. 14, 1913.
2 SHEETS—SHEET 1.
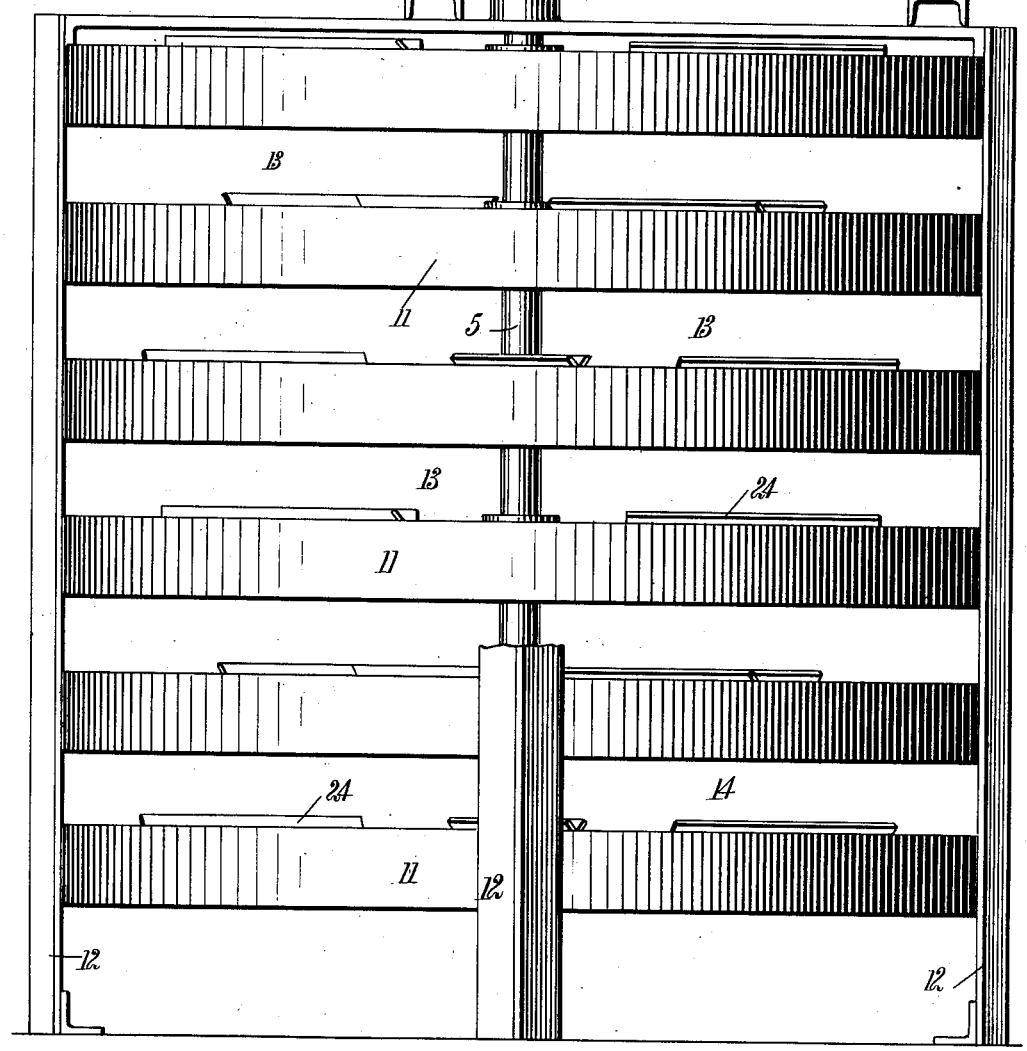
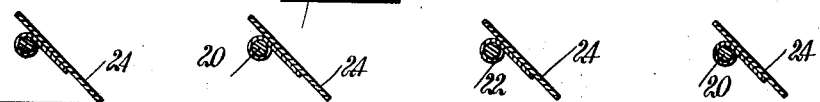
WITNESSES
G. Robert Thomas
W. S. Oxton
INVENTOR
Paul G. Hollstein
BY Munn & Co
ATTORNEYS P. G. HOLLSTEIN.
POWDERED COCOA FLUFFER, MIXER, AND COOLER.
APPLICATION FILED JAN. 10, 1912.
1,050,738.
Patented Jan. 14, 1913.
2 SHEETS—SHEET 2.
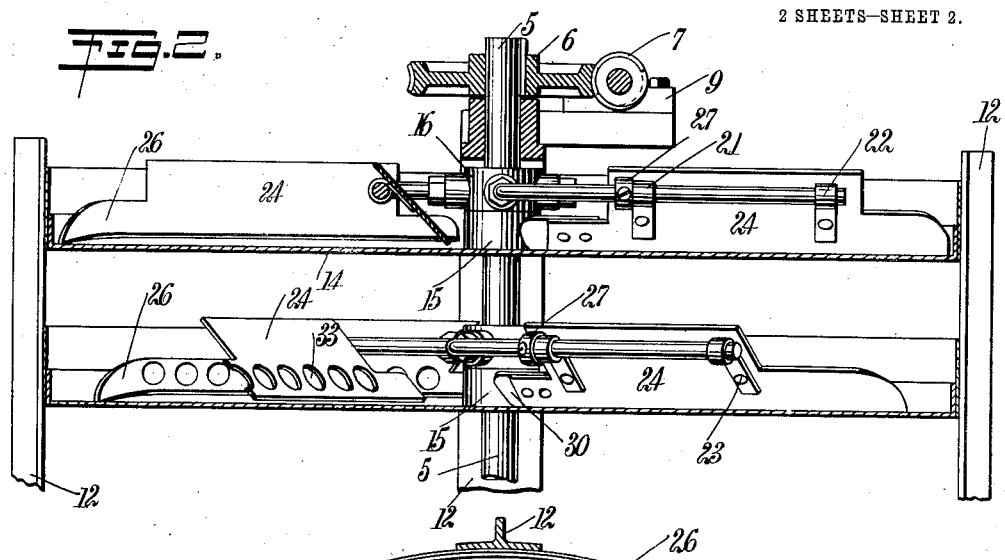
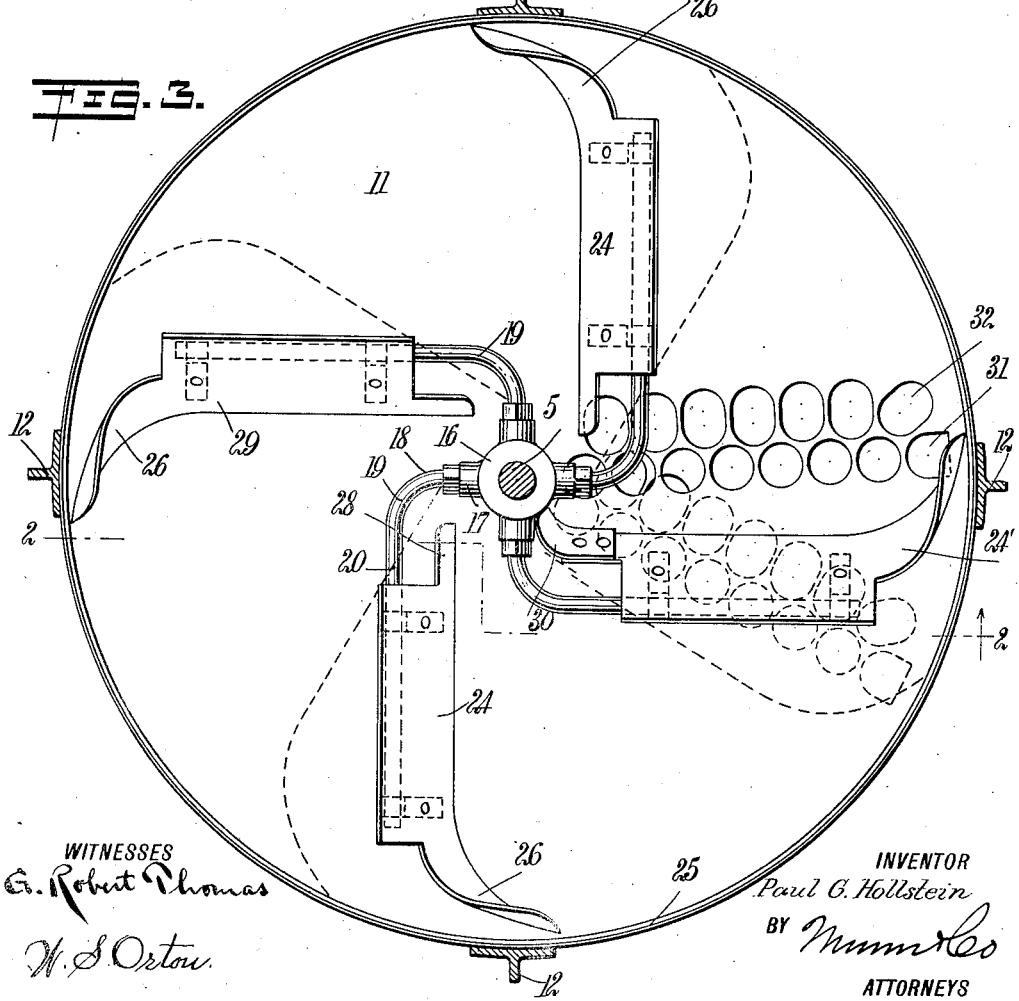
WITNESSES
G. Robert Thomas
W. S. Orton
INVENTOR
Paul G. Hollstein
BY Munn & Co
ATTORNEYS

UNITED STATES PATENT OFFICE.

PAUL G. HOLLSTEIN, OF CARLSTADT, NEW JERSEY.

POWDERED-COCOA FLUFFER, MIXER, AND COOLER.

1,050,738.  Specification of Letters Patent.  Patented Jan. 14, 1913.

Application filed January 10, 1912. Serial No. 670,388.

*To all whom it may concern:*

Be it known that I, PAUL G. HOLLSTEIN, a subject of the German Emperor, and a resident of Carlstadt, in the county of Bergen and State of New Jersey, have invented a new and Improved Powdered-Cocoa Fluffer, Mixer, and Cooler, of which the following is a full, clear, and exact description.

My invention relates to a new and improved form of cocoa fluffer, kneader and cooler, and an object of my invention is to provide a device into which the pulverized cocoa is fed after the cocoa-butter oil is extracted, and the cocoa subjected to a cooling, smoothing, fluffing and aerating process as it is slowly passed through the same.

I attain the above outlined object by positioning a number of superimposed pans, in each of which pans are revolving arms, said arms acting in succession on the cocoa, to cool, stir up, fluff, mix and knead the particles of cocoa, after which they are forced through openings in the bottom of one pan to the next succeeding lower pan where the same operation is repeated, and so on until the last pan is reached, when the cocoa is swept into a suitable receptacle and is ready for bolting.

Reference is to be had to the accompanying drawings, forming a part of this specification, in which similar characters of reference indicate corresponding parts in all the figures, and in which—

Figure 1 is a side elevation of a preferred embodiment of my invention; Fig. 2 is a transverse sectional view of the upper two pans, said view being taken on the line 2—2 of Fig. 3 and looking in the direction of the arrow; Fig. 3 is a plan view looking down upon the top pan; and Fig. 4 is a diagrammatic representation of the blades shown in cross section in their sequence relative to each other and to the bottom of the pan.

Described more in detail, I have shown disposed centrally of my machine, a vertically disposed shaft 5, the lower end of which is suitably journaled, and rigidly keyed to the upper end is a gear 6 actuated by any suitable mechanism, in this instance
shown to be a worm cylinder 7 rigidly mounted upon a suitable power shaft 8, which shaft is mounted in journals 9 and 10. Concentrically disposed relative to said shaft 8 are a series of shallow pans 11, one disposed above the other and supported in position by means of standards 12, in this instance shown to be four T bars spaced ninety degrees apart with the longitudinal center of the shaft as the apex of the angle. It will be noted from the above outlined construction that a free air space 13 is formed between succeeding pans.

Rigidly attached to the center of the bottom 14 of each of the pans and surrounding the shaft 5, is a sleeve 15. Rotatably mounted upon each of the sleeves 15 and suitably keyed to the shaft 5, is a sleeve 16, which sleeve, in this instance, has four arms 17 radiating therefrom and at ninety degrees to each other. Rigidly carried by each of the arms 17, is the short arm 18 of an L-shaped rod 19, the long arm 20 of said L-shaped rod extending parallel to and offset from a diameter passing through said shaft. Pivotally mounted upon the long arm 20 of the rod 19, is a pair of spaced-apart straps 21 and 22, which straps are fastened by means of rivets 23, to the back of a forwardly and downwardly-inclined plate 24, said plate, as shown more particularly in Fig. 3, being inclined in the direction of movement of the rotating rod 19, in this case shown to be anti-clockwise. The outer end of the plate 24, that is, the end adjacent the inner face 25 of the pan 11, is of reduced thickness and is curved forwardly, to form a flexible scoop 26 tilted slightly upward. The plates 24 are limited in their inward movement by a suitable stop ring 27 adjustably positioned on the long arm 20 of the rod 19, as shown more particularly in Fig. 2. Further, the lower end of the plates 24 opposite the scoop 26, is formed into a reduced extension 28, in three of which plates this extension terminates at the intersection of its lower edge 29 and a tangent to the sleeve 16. One of the plates 24, hereinafter referred to as the " scraper 24' " has a curved scraper plate 30 riveted to the extension 28 and engaging the sleeve 15. This scraper 24' bears on the bottom of the pan 11 and collects all of the powdered cocoa, permitting the same to fall through openings 31 and 32 in the bottom of the plate into position on the bottom of the next succeeding plate, just in advance of the similarly constructed openings 31 and 32 in this next succeeding lower plate. All of the plates 24, with the exception of the scraper 24', have their lower edges positioned successfully higher distances from the scraper 24', counting in the direction of movement and as shown more particularly in Fig. 4. The four plates 24 of the top pan are unperforated as is also the scraper plate of each of the succeeding pans, but all of the other plates have a horizontal series of apertures 33 extending therethrough, which apertures, as shown in Fig. 2, extend through the plate just above the lower edge, and also extend through the scoop 26. As shown in dotted lines in Fig. 3, each set of plates in the succeeding pans counting from the bottom, is positioned a slight angular distance in advance of the plates in the pan just below, so that the scraper of the pan next above will dump the powdered cocoa on to the pan next below, just in advance of the plate 24 which is positioned the highest distance from the bottom of this pan.

It will be seen by the above outlined construction, that after the cocoa is fed by any suitable means into the upper pan, it is smoothed and leveled by means of the unperforated plates in said upper pan, and is then forced through the openings in the bottom of the pan into the next adjacent pan where it is acted upon in successive layers by the perforated plates 24, causing a fluffing, kneading and loosening, as well as a cooling action on the pulverized particles of cocoa, and this combined action is repeated in the succeeding pans over as long a cycle as desired.

It will be noted that the pans are comparatively shallow and that as the particles of cocoa are fed from one pan to the next, they are subjected to the air in the space 13, thereby aerating the cocoa, after which the cocoa is withdrawn into a suitable receptacle and boxed.

Having thus described my invention, I claim as new and desire to secure by Letters Patent:

1. In a cocoa fluffer and kneader, a series of superimposed pans spaced apart to form an open drying air space between successive pans, means supporting said pans in position, a centrally disposed shaft, and plates parallel to the bottoms of said pans mounted on said shaft and rotating in each of said pans, each of said pans having a series of openings in the bottom thereof and to one side of said shaft, whereby the cocoa is kneaded in each of said pans and is caused to pass through an open air space as the same is fed from one pan to the next succeeding pan.

2. In a cocoa fluffer and kneader, a series of superimposed pans spaced apart to form an open air space therebetween, means supporting said pans in position, a centrally disposed shaft, and plates mounted on said shaft and rotating in each of said pans, each of said pans having a series of openings in the bottom thereof and to one side of said shaft, whereby the cocoa is kneaded in each of said pans and is fed from one pan to the next through an open air space, the plates in one pan being positioned slightly in advance angularly of the corresponding plates in the pan next below.

3. In a cocoa fluffer and kneader, a series of superimposed pans spaced apart to form an open air space therebetween, means supporting said pans in position, a centrally disposed shaft, and plates mounted on said shaft and rotating in each of said pans, each of said pans having a series of openings in the bottom thereof and to one side of said shaft, whereby the cocoa is kneaded in each of said pans and is fed from one pan to the next through an open air space, the plates in one pan being positioned slightly in advance angularly of the corresponding plates in the pan next below, one of said plates being a scraper and the other of said plates being positioned different distances from the bottom of their respective pans.

4. In a cocoa fluffer, and kneader, a shallow pan, a shaft extending centrally through the bottom of said pan, and plates carried by said shaft and rotating in said pan, each of said plates being extended downwardly and forwardly in the direction of movement and the lower edge of each plate being positioned in a line offset from and parallel with the diameter of said shaft, one of said plates being a scraper plate having its lower edge in engagement with the bottom of said pan, the bottom edges of the other plates following said scraper plate being progressively different distances from the bottom of the pan, the plate immediately following the scraper plate being positioned farthest from the bottom.

5. In a cocoa fluffing machine, a flat pan, means for fluffing pulverized cocoa in said pan, said means comprising a plate parallel to the bottom of said pan and having its upper edge inclined away from the direction of movement, said plate having apertures therein parallel with and above the bottom edge thereof.

6. In a cocoa fluffing machine, a series of inclined plates moving through the pulverized cocoa in succession, all plates but one having apertures extending therethrough, said apertured plates acting to fluff the cocoa, and the unapertured plate being a scraper to remove the fluffed cocoa from the path of the succeeding plates.

In testimony whereof I have signed my name to this specification in the presence of two subscribing witnesses.

PAUL G. HOLLSTEIN.

Witnesses:
WARREN S. ORTON,
PHILIP D. ROLLHAUS.